Sept. 20, 1966  S. HOLLMANN ETAL  3,274,478
DIRECT CURRENT CONVERTER ARRANGEMENT
Filed May 7, 1962
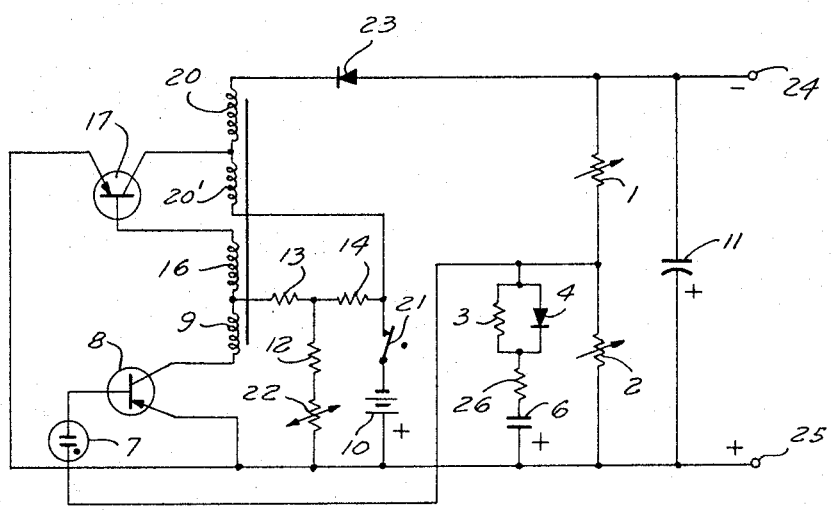
INVENTORS
Siegfried Hollmann,
Heinz Engelstötter, and
BY   Karl Reuresch
Michael S. Striker
Attorney

United States Patent Office 3,274,478
Patented Sept. 20, 1966

3,274,478
DIRECT CURRENT CONVERTER ARRANGEMENT
Siegfried Hollmann and Heinz Engelstätter, Frankfurt am Main, and Karl Buresch, Offenbach-Bieber, Germany, assignors to Braun Aktiengesellschaft, Frankfurt am Main, Germany
Filed May 7, 1962, Ser. No. 192,848
Claims priority, application Germany, May 6, 1961, B 62,412
8 Claims. (Cl. 321—18)

The present invention concerns a direct current converter for deriving a comparatively high direct current output voltage from a source of comparatively lower direct current voltage.

In converters of this type the low voltage of the source is first converted in a primary circuit into an alternating voltage by means of an oscillator circuit. This alternating voltage is raised by means of a step-up transformer and is then rectified in a secondary circuit of the arrangement. The oscillator circuit preferably comprises a transistor suitable for comparatively high power output in a feed back arrangement. The thus obtained high direct current voltage is stored in a storage condenser at the terminals of which it is available for operating devices calling for a supply with such high direct current voltage, particularly electrical discharge devices as for instance, photographic flash light devices. It is however, a requirement in such converters that the output voltage available at the terminals of the storage condenser is as constant as possible without being affected by interfering influences. Therefore, regulating means must be incorporated in the converter arrangement.

Various types of regulator arrangements for converters as mentioned above, have been proposed. However they have been found unsatisfactory because of being rather involved in structure or because they consume too much energy that has to be derived from the secondary circuit of the arrangement. In one of the known converter systems to be improved by the present invention the operation of the oscillatory circuit is stopped when the desired output voltage at the terminals of the storage condenser in the secondary circuit has been reached, and this is done by utilizing the current of a glow lamp located in the secondary circuit and an auxiliary condenser discharging across the glow lamp, an auxiliary transistor being provided which is controlled by the current passing through the glow lamp and which cuts out the feedback voltage applied to the main transistor forming part of the oscillatory circuit. The oscillatory circuit re-starts its operation when the output voltage decreases from a desired or predetermined value thereof, either because the storage condenser is discharged or because of leakage losses in the circuit. In such case the glow lamp becomes extinguished.

A difficulty found in an arrangement of this type which constitute a two-point regulation resides in the fact that the glow lamp current alone, even if amplified by a transistor would not suffice to suppress the oscillations in the main transistor circuit, while, on the other hand, in the case of using an auxiliary impulse condenser in the glow lamp circuit sawtooth oscillations appear which require additional circuit arrangements in order to smoothen the impulses emanating from the glow lamp.

A further disadvantage of such known arrangements consists in the impossibility of making the internal resistance of the control transistor, when in conductive condition, as small as would be desirable. In addition, it cannot be achieved that the feedback voltage applied to the main transistor is sufficiently reduced unless special parameters are chosen which, however, impair the efficiency of the arrangement. Finally, if it is desired to assure prompt re-starting of the oscillatory circuit when the glow lamp becomes extinguished a very substantial change of the current passing through the main transistor is required. However, this would pre-suppose that this current has a comparatively high normal value, a condition which is highly undesirable if the converter arrangement is operated by a storage battery.

It is therefore one of the objects of this invention to provide for a direct current converter arrangement of the type set forth which is free of the above disadvantages.

It is another object of this invention to provide for an arrangement as mentioned above which is comparatively simple, economical and reliable in operation.

With the above objects in view, the invention includes a direct current converter arrangement for deriving a comparatively high direct current output voltage from a source of comparatively lower direct current voltage, comprising, in combination, a source of direct current voltage of predetermined magnitude; a step-up transformer having an input winding, an output winding and at least one auxiliary winding; primary circuit means including a main transistor having a base, an emitter and a collector and having its emitter-collector circuit connected in series with said input winding and said source of direct current voltage, said base and a first voltage divider means being connected in series with said auxiliary winding to one terminal of said source so as to furnish feedback voltage to said base, said primary circuit means constituting feedback oscillator circuit; secondary circuit means including said output winding, a first rectifier a storage condenser and said source in series-connection for charging said storage condenser to the desired output voltage available at the terminals of said storage condenser; second voltage divider means connected in parallel with said storage condenser for providing at a tapping point thereof a predetermined control voltage in proportion to said desired output voltage; a glow lamp adapted to be ignited by said predetermined control voltage and having one terminal connected with said tapping point of said second voltage divider means; a control transistor having a base, an emitter and a collector and having its base connected to the other terminal of said glow lamp, said control transistor being connected for attenuating the feedback voltage applied to said base of said main transistor and for thereby stopping the operation of said oscillator circuit when said control transistor is rendered conductive after ignition of said glow lamp, the emitter of said control transistor being connected to one end of said second voltage divider means; and regulator circuit means comprising a series-combination of a second rectifier and an impulse condenser, said series-combination being connected in parallel with that portion of said second voltage divider means which is located between said tapping point and said one end thereof, said impulse condenser being chargeable by current flowing across said second rectifier in a direction opposite to its normal current-passing direction and furnished by said output winding, and said impulse condenser being dischargeable across said second rectifier in the current-passing direction thereof when after ignition of said glow lamp the voltage drop across the latter decreases below the ignition voltage thereof, so that a discharge current impulse of said impulse condenser is superimposed on the normal operating current flowing across said glow lamp whereby said control transistor is rendered conductive and operation of said oscillator circuit is stopped.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing, in which an embodiment of the invention is illustrated in the form of a schematic circuit diagram.

Before describing the circuit in detail, the following general remarks should be taken into consideration.

By the above specified arrangement the oscillations of the oscillatory circuit containing the main transistor are reliably suppressed when desired. A discharge of the impulse condenser below the operating voltage of the glow lamp is prevented by the second rectifier connected in series therewith. Consequently, the glow lamp will continue to operate although with a very small current which, however, prevents a starting of the oscillations in the main transistor circuit. The glow lamp becomes extinguished only when the output voltage of the secondary circuit, or rather a proportional part thereof, decreases below a threshold value at which the glow lamp becomes extinguished.

In order to be sure that the oscillations are suppressed when desired, independently of the internal resistance of the control transistor, the emitter-collector circuit thereof is not connected, according to the invention, in parallel with the feedback winding cooperating with the main transistor so as to constitute a resistance, but the above mentioned emitter-collector circuit is inductively coupled with said feedback winding in opposite sense. For this purpose the invention utilizes the existing step-up transformer of the arrangement by adding only one more auxiliary winding thereto. In this manner it is always possible to sufficiently attenuate the feedback applied to the main transistor. On the other hand, the magnetic field of the transformer collapsing when the control transistor is rendered non-conductive by the glow lamp becoming extinguished generates a negative impulse in the feedback winding which causes reliably a re-starting of the oscillations of the oscillatory circuit including the main transistor.

It is of advantage also that the control transistor not only controls the operation of the oscillatory circuit but causes also a shift of the working point because its inner resistance is connected in parallel with a portion of the voltage divider which furnishes the bias voltage for the main transistor.

The embodiment illustrated in the drawing particularly applies to a direct current converter arrangement which is adapted to serve as a power supply for a portable electronic discharge device operated by a storage battery.

The arrangement as illustrated comprises a primary circuit including a storage battery 10, a switch 21 and winding portion 20' and the emitter-collector circuit of a main transistor 17. The winding portion 20' constitutes the input winding of an autotransformer having an output winding 20 of which the input winding 20' is a portion. The base circuit of the main transistor 17 includes a feedback winding 16 constituting an auxiliary winding of the autotransformer so that a portion of the voltage produced in the output winding 20 is inductively applied in opposite sense to the auxiliary winding 16. The base of the main transistor 17 is provided with a bias voltage from the storage battery 10 by means of a resistor 13 connected with a junction point in a voltage divider arrangement 14, 12, 22 connected in parallel with the battery 10. The resistor 22 is of the NTC type and is variable with temperature so that hereby a temperature-responsive shift in the operation of the transistor 17 is compensated.

The outer ends of the output winding 20 of the autotransformer are connected in the secondary circuit of the arrangement which includes a rectifier 23, a parallel combination composed of a storage condenser 11 and a voltage divider 1, 2, battery 10 and switch 21. The alternating current voltage induced in the output winding 20 when the oscillatory circuit is in operation is rectified by the rectifier 23 and charges the storage condenser 11. The output terminals 24, 25 may be considered as being the output terminals of the storage condenser 11 so that at these terminals the desired direct current output voltage of the arrangement is available so as to be furnished to an electrical device which is to be supplied with such output voltage.

A regulator circuit is provided which starts at a tapping point or junction point between the voltage divider resistors 1 and 2 and includes the glow lamp 7 and the base-emitter circuit of a control transistor 8. The emitter thereof is connected, as shown, to one end of the voltage divider 1, 2. The control portion of the regulator circuit includes the emitter-collector circuit of the control transistor 8, a second auxiliary winding 9 of the autotransformer and the resistor combination 13, 12, 22. The regulator circuit further comprises an impulse producing network including a rectifier 4 and a control condenser 6, preferably also resistors 3 and 26 in an arrangement as illustrated, this impulse producing network being connected in parallel with the resistor 2, i.e. between the above mentioned tapping or junction point and the above mentioned one end of the voltage divider 1, 2.

The voltage divider 1, 2 located in the secondary circuit of the converter arrangement is so dimensioned or adjusted by adjusting the variable resistors 1 and 2 that the glow lamp 7 is ignited by the control voltage available at the above mentioned junction point when the charge voltage across the storage condenser 11 is equal to the desired or predetermined output voltage. In the glow lamp circuit an impulse current from the control condenser 6 is superimposed at a given moment on the direct current flowing through the glow lamp. The control condenser 6 is charged during the increase of the voltage charging the storage condenser 11. This is done by a portion of the voltage furnished by the output winding 20 and applied to the condenser 6 across the rectifier 4 (in a direction opposite to its current-passing direction) and the preferably provided high resistance 3 connected in parallel therewith. The discharge of the control condenser 6 occurs when after the ignition of the glow lamp the voltage drop thereacross decreases from ignition voltage to normal operating voltage. In this case current can flow in the normal direction through the rectifier 4 so that now the control condenser 6 is able to furnish a discharge impulse until the charge voltage of the control condenser 6 is decreased to said operating voltage. A further discharge of condenser 6 to a voltage value below this last mentioned voltage value is prevented by the rectifier 4 so that no sawtooth oscillations can occur in the glow lamp circuit.

The resulting impulse current in the glow lamp circuit renders the control transistor 8 conductive so that its emitter-collector circuit which is supplied by the battery 10 is able to energize the auxiliary winding 9 which is inductively coupled in a counteracting manner with the feedback winding 16 cooperating with the main transistor 17.

The parameters of the above mentioned transformer windings and the degree of inductive coupling therebetween can be adjusted to the characteristics of the glow lamp 7 and of the control transistor 8 in such a manner that the oscillations of the feedback oscillator circuit including the transistor 17 and the windings 20' and 16 are effectively suppressed when desired.

After the oscillations end a small direct current of about .05 ma. passes through the glow lamp and is amplified by the transistor 8. This small current, after amplification, suffices to prevent a re-start of the operation of the oscillatory circuit. At the same time this current serves to shift the working point of the main transistor 17 in positive direction because of the voltage drop across the resistor 13 and the voltage divided 14, 12, 22. Consequently only a very low current will flow continuously through the transistor 17. As soon as the glow lamp becomes extinguished the control transistor 8 is blocked and the main transistor 17 obtains again its negative base potential via the voltage divider 14, 12, 22 so that hereby, in cooperation with a negative impulse resulting from the collapse of the magnetic field of the step up transformer, the operation of the oscillatory circuit is started.

It will be understood that each of the elements described above, or two or more together, may also find a useful application in other types of a direct current converter arrangement differing from the types described above.

While the invention has been illustrated and described as embodied in a direct current converter arrangement including a regulator circuit, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A direct current converter arrangement for deriving a comparatively high direct voltage output from a source of comparatively lower direct voltage, comprising, in combination, a source of direct voltage of predetermined magnitude; transistor oscillator means including a step-up transformer having a primary winding in circuit with said source, a feedback winding, and a secondary winding, and a main transistor having three electrodes, of which one is connected to said primary winding and a second one is connected to one end of said feedback winding, and a control transistor means having a control electrode and two operative electrodes, the latter being connected between the third electrode of said main transistor and the other end of said feedback winding; a storage capacitor means and a first diode means so connected in series with each other between one terminal of said secondary winding and one terminal of said source that said storage capacitor is chargeable thereby to a desired output voltage, the terminals of said storage capacitor means constituting the direct voltage output terminals of the converter arrangement; voltage divider means connected in parallel with said storage capacitor means and having an intermediate tapping point; glow lamp means ignitable when said storage capacitor means is charged to said desired output voltage, one electrode of said glow lamp means being connected to said tapping point of said voltage divider means, the other electrodes of said glow lamp means being connected to said control electrode of said control transistor means so that said control transistor means causes the oscillation of said oscillator means to stop when said glow lamp means is ignited and to start when said glow lamp means is extinguished; and a series-combination of a second diode means and an impulse capacitor means connected between said tapping point of said voltage divider means and one of said operative electrodes of said control transistor means, said second diode means being arranged with such polarity that said impulse capacitor means is charged via the reverse resistance of said second diode means when the potential at said tapping point drops below a predetermined value, and that it is discharged via the forward resistance of said second diode means when the potential at said tapping point exceeds a predetermined value.

2. A direct current converter arrangement for deriving a comparatively high direct voltage output from a source of comparatively lower direct voltage, comprising, in combination, a source of direct voltage of predetermined magnitude; transistor oscillator means including a step-up transformer having a primary winding in circuit with said source, a feedback winding, and a secondary winding, and a main transistor having three electrodes, of which one is connected to said primary winding and a second one is connected to one end of said feedback winding, and a control transistor means having a control electrode and two operative electrodes, the latter being connected between the third electrode of said main transistor and the other end of said feedback winding; a storage capacitor means and a first diode means so connected in series with each other between one terminal of said secondary winding and one terminal of said source that said storage capacitor is chargeable thereby to a desired output voltage, the terminals of said storage capacitor means constituting the direct voltage output terminals of the converter arrangement; voltage divider means connected in parallel with said storage capacitor means and having an intermediate tapping point; glow lamp means ignitable when said storage capacitor means is charged to said desired output voltage, one electrode of said glow lamp means being connected to said tapping point of said voltage divider means, the other electrode of said glow lamp means being connected to said control electrode of said control transistor means so that said control transistor means causes the oscillation of said oscillator means to stop when said glow lamp means is ignited and to start when said glow lamp means is extinguished; and a series-combination of a second diode means and an impulse capacitor means connected between said tapping point of said voltage divider means and one of said operative electrodes of said control transistor means, and a resistor means connected in parallel with said second diode means, said second diode means being arranged with such polarity that said impulse capacitor means is charged via the reverse resistance of said second diode means when the potential at said tapping point drops below a predetermined value, and that it is discharged via the forward resistance of said second diode means when the potential at said tapping point exceeds a predetermined value.

3. A converter arrangement according to claim 1 wherein said step-up transformer has an auxiliary winding connected between said feedback winding and one of said operative electrodes of said control transistor in such a manner that the flow of current from said control transistor through said auxiliary winding inductively counteracts the supply of feedback voltage from said feedback winding to said second electrode of said main transistor.

4. A converter arrangement according to claim 2 wherein said step-up transformer has an auxiliary winding connected between said feedback winding and one of said operative electrodes of said control transistor in such a manner that the flow of current from said control transistor through said auxiliary winding inductively counteracts the supply of feedback voltage from said feedback winding to said second electrode of said main transistor.

5. A converter arrangement according to claim 1 wherein said transistor oscillator means comprises a biasing voltage divider connected between said source and said feedback winding.

6. A converter arrangement according to claim 2 wherein said transistor oscillator means comprises a biasing voltage divider connected between said source and said feedback winding.

7. A converter arrangement according to claim 5 wherein a tapping point of said biasing voltage divider is on one hand connected to said main transistor via said feedback winding, on the other hand connected to one of said operative electrodes of said control transistor.

8. A converter arrangement according to claim 6 wherein a tapping point of said biasing voltage divider is on one hand connected to said main transistor via said feedback winding, on the other hand connected to one of said operative electrodes of said control transistor.

References Cited by the Examiner

UNITED STATES PATENTS

| 2,946,924 | 7/1960 | Gerlach et al. | 321—2 X |
| 2,977,524 | 3/1961 | Lingle | 321—2 X |

JOHN F. COUCH, *Primary Examiner.*

LLOYD McCOLLUM, *Examiner.*

G. H. GERSTMAN, M. WACHTELL,
*Assistant Examiners.*